US008930465B2

(12) United States Patent
Jaffer et al.

(10) Patent No.: US 8,930,465 B2
(45) Date of Patent: Jan. 6, 2015

(54) CONTEXT-AWARE CONTENT TRANSMISSION UTILITY

(75) Inventors: Akbar Jaffer, Union City, CA (US); Richard Dean Day, Ashburn, VA (US)

(73) Assignee: Oracle International Corporation, Redwood Shores, CA (US)

( * ) Notice: Subject to any disclaimer, the term of this patent is extended or adjusted under 35 U.S.C. 154(b) by 822 days.

(21) Appl. No.: 12/117,969

(22) Filed: May 9, 2008

(65) Prior Publication Data

US 2009/0282106 A1 Nov. 12, 2009

(51) Int. Cl.
*G06F 15/16* (2006.01)
*G06Q 10/00* (2012.01)
*H04M 3/51* (2006.01)

(52) U.S. Cl.
CPC ............. *G06Q 10/00* (2013.01); *H04M 3/5191* (2013.01)
USPC ........................... 709/206; 709/202; 709/227

(58) Field of Classification Search
USPC .......................................... 709/206, 202, 227
See application file for complete search history.

(56) References Cited

U.S. PATENT DOCUMENTS

| 2002/0161928 A1* | 10/2002 | Ndili ............................. 709/246 |
| 2003/0055910 A1* | 3/2003 | Amini et al. .................. 709/214 |
| 2005/0193055 A1* | 9/2005 | Angel et al. .................. 709/202 |
| 2009/0245500 A1* | 10/2009 | Wampler ................. 379/265.09 |

OTHER PUBLICATIONS

Booker, Q.; Farrar, S.; McQuaid, M.; Lopez, A, "Advanced question and answering systems for community development," System Sciences, 2002. HICSS. Proceedings of the 35th Annual Hawaii International Conference on , vol., No., pp. 91,95, Jan. 7-10, 2002.*
Zon-Yin Shae; Garg, D.; Bhose, R.; Mukherjee, R.; Guven, S.; Pingali, G., "Efficient Internet Chat Services for Help Desk Agents," Services Computing, 2007. SCC 2007. IEEE International Conference on , vol., No., pp. 589, 596, Jul. 9-13, 2007.*
Mee Young Sung; Moon Suck Kim; Myung-Whun Sung; Eom Joon Kim; Jae Hong Yoo, "CoMed: a real-time collaborative medicine system," Computer-Based Medical Systems, 2000. CBMS 2000. Proceedings. 13th IEEE Symposium on , vol., No., pp. 215,220, 2000.*
Siegel, M.A; Ellis, S.E.; Lewis, M.B., "Designing for deep conversation in a scenarios-based e-learning environment," System Sciences, 2004. Proceedings of the 37th Annual Hawaii International Conference on , vol., No., pp. 10 pp.,, Jan. 5-8, 2004.*

* cited by examiner

*Primary Examiner* — Taylor Elfervig
(74) *Attorney, Agent, or Firm* — Campbell Stephenson LLP

(57) ABSTRACT

A method is disclosed. The method includes monitoring a user interface for a data item delivery request. In response to receipt of the data item delivery request, a data type for a data item selected for a delivery is determined, and a schema for performing the delivery is selected. Content of the data item for the delivery is selected, and the content is sent using the schema. The delivery is recorded in an activity log.

24 Claims, 10 Drawing Sheets

CONTEXT-AWARE CONTENT TRANSMISSION UTILITY

BACKGROUND

Agent interfaces are becoming increasingly sophisticated in their ability to allow access to numerous types of application data and/or application systems across multiple forms of communication. For example, a typical customer service application may include an agent interface to allow a customer service agent to navigate among a variety of types of data related to a customer and to products. Such product data may include a knowledge base or other database of product information, while customer data may include contact information, service request information, order information, activity information, and so on. A customer service agent interacting with a customer may need to quickly share with a customer several of these types of information during, for example, the course of a single telephone conversation or electronic chat.

In order to provide prompt and efficient service, it is desirable that customer service agents be able to share data with the customer in a fast and efficient manner. Since customer service centers receive a large volume and variety of customer interactions during a typical day, each agent needs to have quick access to tools for sharing important data, such as service requests, knowledge base documents, contact name, account number, phone number, and so on. When an agent wastes time by fumbling with an agent interface for a transfer of data, sending to a customer an inapplicable resource, or delaying the delivery of a resource, costs are increased. These costs come in both the form of agent time and the form of customer dissatisfaction.

SUMMARY

A method is disclosed. The method includes monitoring an agent interface for a data item delivery request. In response to receipt of the data item delivery request, a data type for a data item selected for a delivery is determined, and a schema for performing the delivery is selected. Content of the data item for the delivery is selected, and the content is sent using the schema. The delivery is recorded in an activity log.

BRIEF DESCRIPTION OF THE DRAWINGS

The present invention may be better understood, and its numerous objects, features and advantages made apparent to those skilled in the art by referencing the accompanying drawings.

Figure 1A:
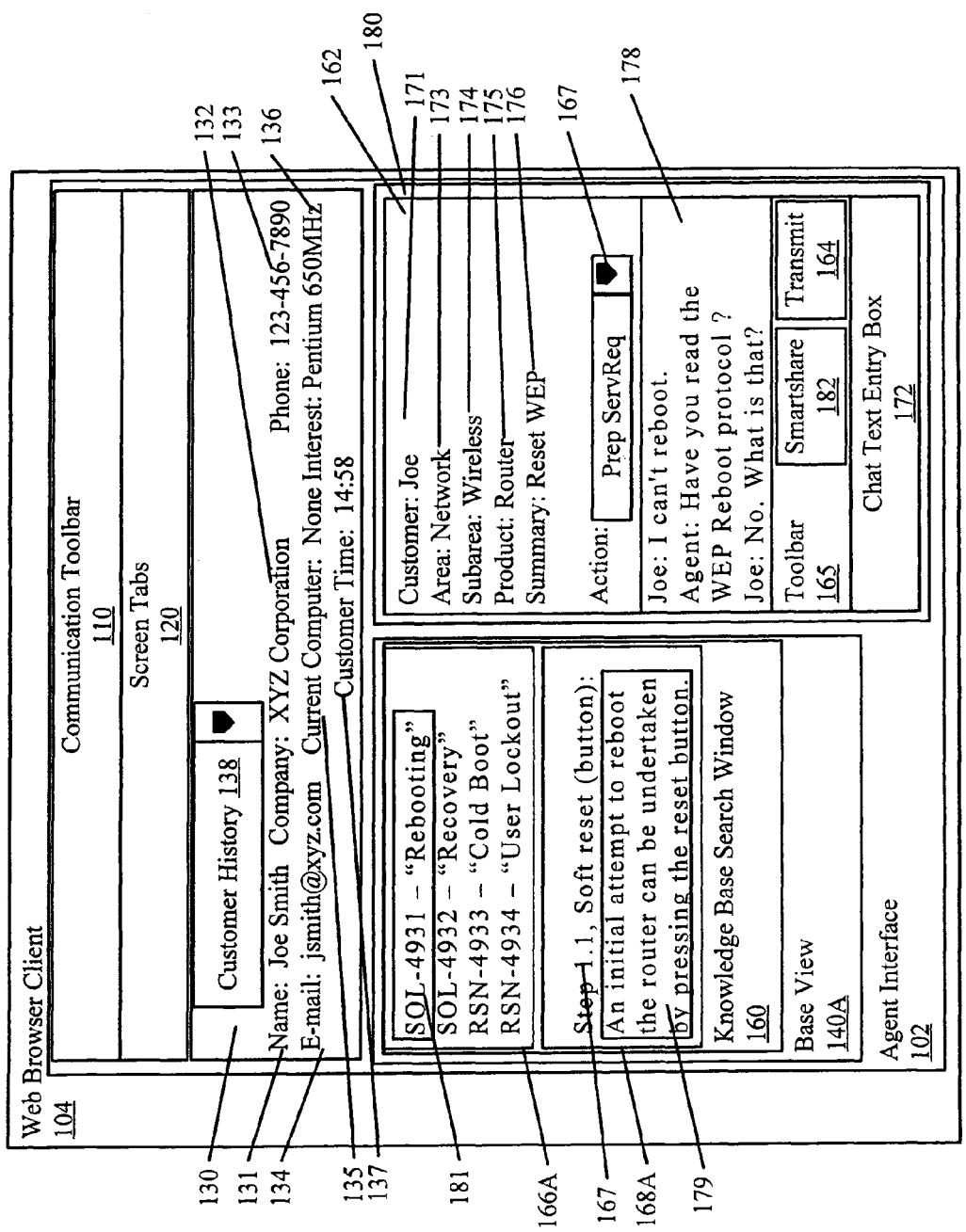
FIG. 1A provides an example of an agent interface including both a chat utility and a smart share utility in accordance with one embodiment of the present invention.

The use of the same reference symbols in different drawings indicates similar or identical items. While the invention is susceptible to various modifications and alternative forms, specific embodiments thereof are shown by way of example in the Drawings and are described herein in detail. It should be understood, however, that the Drawings and Detailed Description are not intended to limit the invention to the particular form disclosed. On the contrary, the intention is to cover all modifications, equivalents, and alternatives falling within the scope of the present invention as defined by the appended Claims.

DETAILED DESCRIPTION

For a thorough understanding of the subject invention, refer to the following Detailed Description, including the appended Claims, in connection with the above-described Drawings. Although the present invention is described in connection with one or more embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent in light of the present disclosure, however, to one skilled in the art that the invention can be practiced without these specific details.

References in the specification to "one embodiment" or "an embodiment" mean that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention addresses several shortcomings of existing techniques. Specifically, one embodiment of the present invention provides for the selection and transmission of information to a customer on the basis of a schema. Using one embodiment of the present invention, highlighted text is selected by an agent and transmitted through a chat application (optionally after allowing for editing in a text entry box). In one embodiment of the present invention, attributes or components of a selected record are transmitted through a chat interface or via electronic mail through a communication server. In one embodiment of the present invention, the content of a transmission is determined on the basis of the type of content being transmitted.

FIG. 1A shows an agent interface 102 presented for agent use presented by a web browser client 104. In one embodiment, no client software other than a web browser is needed to run the agent interface for the host application. Agent interface 102 includes a communication toolbar 110, screen tabs 120, a persistent dashboard 130, a chat window 180 and a base view 140. Base view 140 contains a knowledge base search window 160. Communication toolbar 110 and screen tabs 120 and knowledge base search window 160 are not essential for the operation of the present invention. Knowledge base search window contains a reference list 166A and a displayed reference 168A in which solution document text is displayed, including highlighted text 179, from a solution identified by a solution identifier 181. Base view 140 represents a display window in which application data are displayed, such that persistent dashboard 130 provides context information related to the application data throughout the customer-agent interaction and without regard to changes in base view 140.

Communication toolbar 110 enables an agent to communicate via multiple types of communication channels, such as e-mail, telephone, facsimile, text chat and wireless messaging supported by various applications on a computer system implementing user interface 102. Screen tabs 120 enable an agent to navigate among various types of application data.

Chat window 180 supports communication between a customer and an agent through text-based messaging, which can include transmission of messages containing a markup language such as HTML, for example. In some embodiments, chat window 180 can additionally support moving video and audio communication. A customer information pane 162 provides information relevant to a customer interaction, such as a username 171, which may contain any identifier used to communicate with a customer, such as a customer's name, username or handle. An area 173 broadly represents a product or service type of interest to the customer on the basis of the customer's indication of interest or data previously stored in relation to the customer. A subarea 174 more narrowly defines the product or service type of interest to the customer on the basis of the customer's indication of interest or data previously stored in relation to the customer. A product 175 defines the specific offering of interest to the customer on the basis of the customer's indication of interest or data previously stored in relation to the customer. A summary 176 provides a brief description of the problem that the customer is trying to solve. An action pulldown menu 167 enables an agent to quickly access actions that may be relevant to the customer's situation, such as preparation of a service request. A chat text entry box 172 allows the agent to enter or edit text for transmission to a customer.

A session window 178 displays a record of transmissions between an agent and a customer. A toolbar 165, below session window 178, allows for the placement of buttons, such as smart share button 182 and transmit button 164. Smart share button 182 activates a context-aware content transmission utility, hereafter called a "smart share."

In the exemplary embodiment shown in FIG. 1A, persistent dashboard 130 includes various data fields such as contact name 131, company 132, phone 133, e-mail 134, current computer 135, interest 136, and customer time 137. Persistent dashboard 130 also includes customer history combo box 138, which enables the agent to view in base view 140 the history of previous communications with the customer whose information is displayed in persistent dashboard 130. As mentioned above, the data fields included in a persistent dashboard, such as persistent dashboard 130, are configurable according to the present invention. For example, an account number, customer's local time, or other relevant context information can be selected to be displayed in persistent dashboard 130. Furthermore, persistent dashboard 130 may be configured to include, for example, Previous and Next buttons (not shown) to enable scrolling to and from information related to previous activity of the agent using the host application, such as calls that the agent had previously attended to during a session using the host application.

In the example embodiment shown, persistent dashboard 130 is visible as a separate frame below the communications toolbar 110 and screen tabs 120 and above the frame including base view 140. In base view 140, the agent can navigate among various types of application data and/or different screens and view of agent interface 102, while persistent dashboard 130 provides a persistent view of context information related to the application data presented in base view 140. For example, the customer service agent can quickly navigate to information related to the active customer in persistent dashboard 130 by selecting from the combo box 138 of persistent dashboard 130. The list of views to which the agent can navigate is customizable and, for example, may include the following:

Contact—Activities (default)
Contact—Activity Plans
Contact details
Contact—Service Requests
Contact—Agreements
Contact—Entitlements
Contact—Campaigns
Contact—Opportunities.

When a view is selected, one or more records related to the active customer are displayed in base view 140.

In one embodiment of the present invention, an agent selects highlighted text 179 from anywhere in agent interface 102 and selects smartshare button 182. Agent interface 102 copies highlighted text 179 into chat text entry box 172. In one embodiment, the agent can edit highlighted text 179 in chat text entry box 172 before selecting transmit button 164 and sending the text to a user, thereby causing the edited text to appear in session window 178. In some embodiments, transmission and display without editing is automatic when smartshare button 182 is selected.

In one embodiment of the present invention, an agent selects solution identifier 181 from reference list 166A and selects smartshare button 182. Agent interface 102 copies solution identifier 181 and a description of a proposed solution from displayed reference 168A into chat text entry box 172. In one embodiment, the agent can edit the description 167 of a proposed solution from displayed reference 168A in chat text entry box 172 before selecting transmit button 164 and sending the text to a user, thereby causing the text to appear in session window 178. In some embodiments, transmission without editing is automatic when smartshare button 182 is selected.

In one embodiment of the present invention, a website for customer service provides access to a repository of information and communication with an agent. As is described with respect to FIG. 1B, a customer interface provides a search utility for allowing the customer to search the knowledge base and retrieve data. Data sent by an agent is shared via a chat window or via email.

Figure 1B:
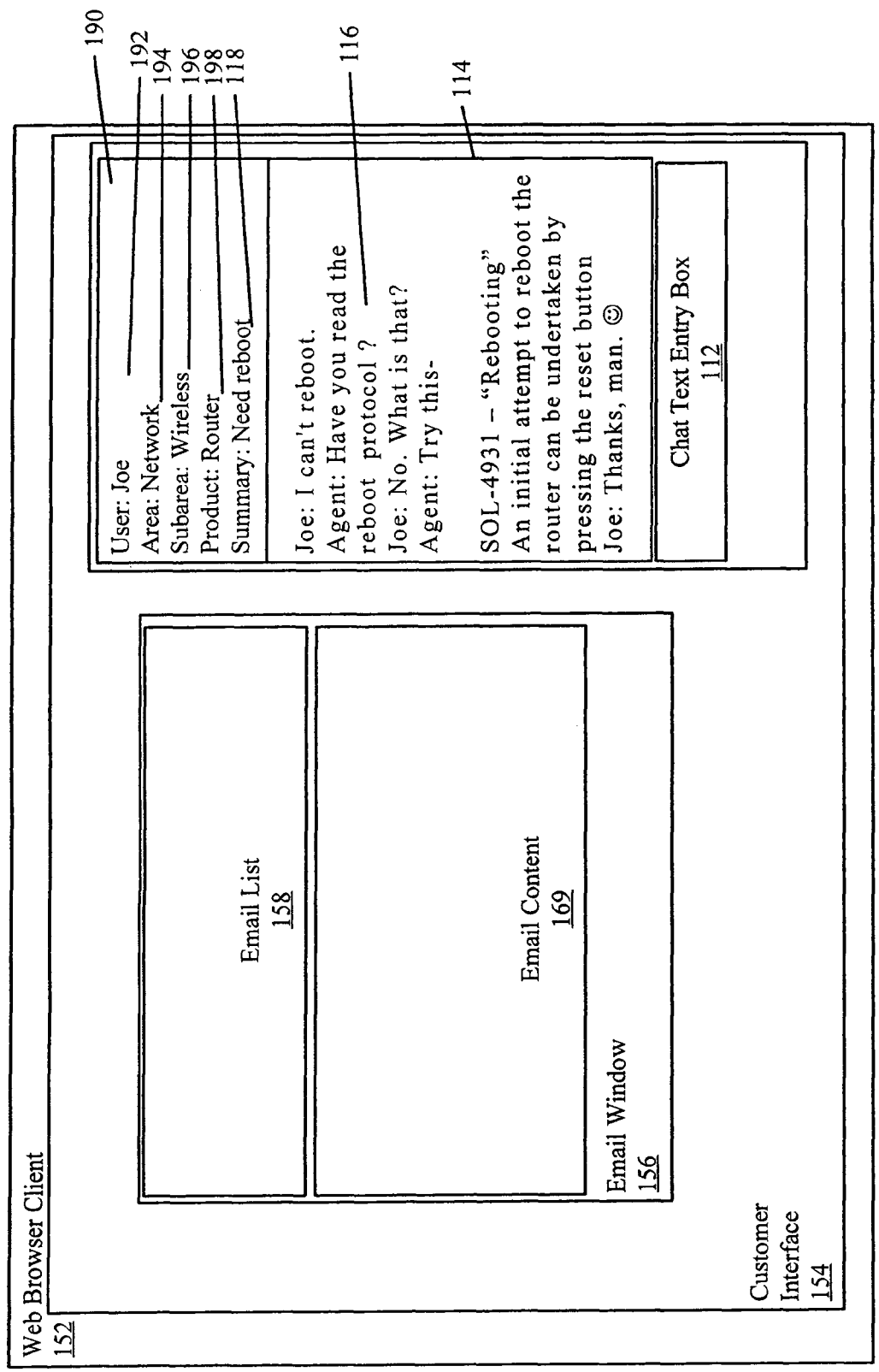
FIG. 1B provides an example of a customer interface including both an email utility and a chat utility in accordance with one embodiment of the present invention.

FIG. 1B provides an example of a customer interface including a both an email utility and a chat utility in accordance with one embodiment of the present invention. A web browser client 152 supports the presentation of a chat window 114 and an email window 156 contained within a customer interface 154. In one embodiment, no client software other than a web browser client 152 is needed to run the customer interface 154 for the host application. In other embodiments, a separate email client can be substituted for the use of email window 156. Email window 156 contains an email list 158 and a email content 169.

Chat window 114 supports communication between a customer and an agent through text-based messaging, as described above. In some embodiments, the chat window can additionally support live video and audio communication. A customer information pane 190 provides an interface for a customer to enter and view information relevant to a customer interaction, such as a username 192, which may contain any identifier used to communicate with a customer, such as a customer's name, username or handle. An area 194 broadly represents a product or service type of interest to the customer on the basis of the customer's entry or selection of an interest or data previously stored in relation to the customer. A subarea 196 more narrowly defines the product or service type of interest to the customer on the basis of the customer's entry or selection of an interest or data previously stored in relation to the customer. A product 198 defines the specific offering of interest to the customer on the basis of the customer's entry or selection of an interest or data previously stored in relation to the customer. A summary 118 provides a brief description of the problem that the customer is encountering. All of this information, as provided by the customer or updated in reference to a database, can be used to populate persistent dashboard 130 and customer information pane 162. A session window 116 displays a record of transmissions between an agent and a customer during a chat session. In one embodiment of the present invention, session window 116 can receive data sent by an agent using the present invention, including highlighted text 179 and information such as a solution identifier 181, which can contain HTML to point a customer to the complete document represented by solution identifier 181.

In some embodiments of the present invention, data sent to a customer by an agent using the present invention will arrive via email as a listing in email list 158 reflecting receipt of an email containing information in the body of email content 169 and attachments. A chat text entry box 112 enables the customer to send messages to an agent.

Figure 1D:
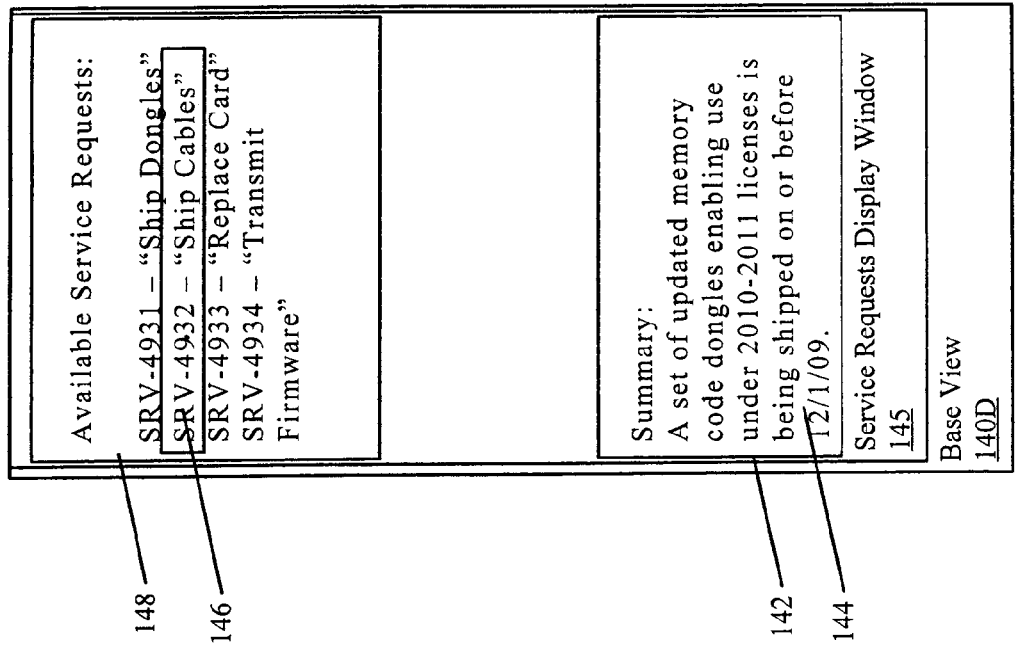
FIG. 1D provides an example of an agent interface including a service request utility for use with a smart share utility in accordance with one embodiment of the present invention.
Figure 1C:
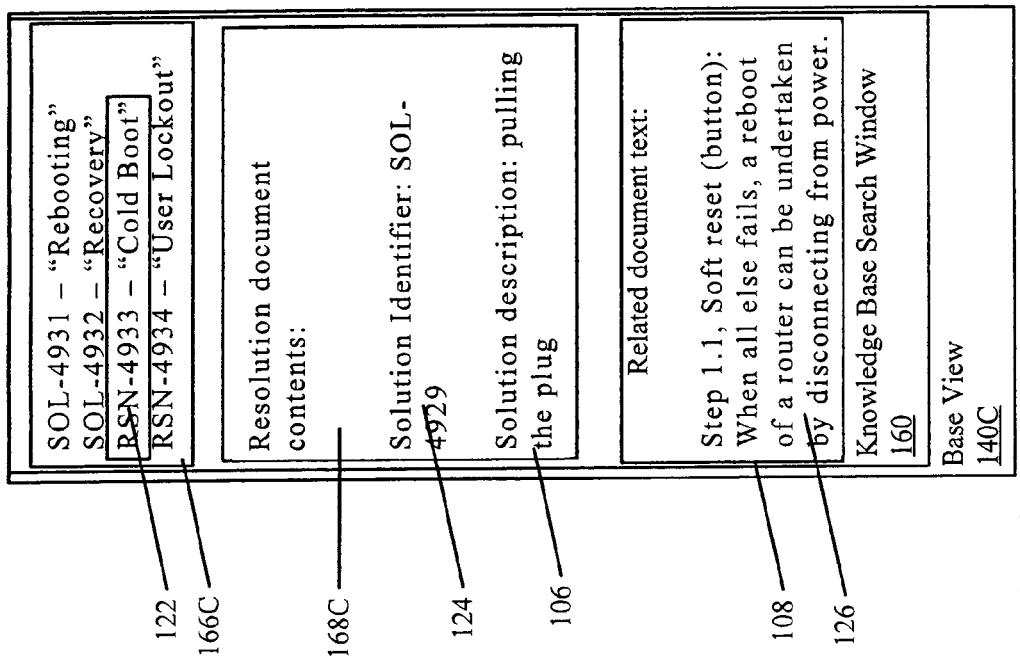
FIG. 1C provides an example of an agent interface including a search utility for use with a smart share utility in accordance with one embodiment of the present invention.

FIG. 1C provides an example of an agent interface including a search utility for use with a smart share utility in accordance with one embodiment of the present invention. In the embodiment shown in FIG. 1C, base view 140C contains a reference list 166C identifying a displayed resolution document (with a resolution document identifier 122) as displayed reference 168C. In the embodiment shown, a resolution document is a multimedia document, such as HTML, containing related text 126 shown in a secondary display window 108 as well as a link to an associated solution identified by a solution identifier 124 and a solution description 106.

In one embodiment of the present invention, selecting smartshare button 182 while a resolution document is selected as displayed reference 168C results in the transmission of an email, through a communication server, which can be received by customer interface 154. The body of the email, which can be displayed as email content 169, includes solution identifier 124, related text 126 and solution description 106. The resolution document identified by resolution document identifier 122 is attached to the email. Additionally, a notice of delivery is transmitted via chat to session window 116. In some embodiments, both the email and the notice of delivery are subject to editing before being sent.

FIG. 1D provides an example of an agent interface including a service request utility for use with a smart share utility in accordance with one embodiment of the present invention. Base view 140D contains a service request display window 145 for displaying to an agent service requests associated with a customer. An available service requests list 148 shows a service request identifier 146 for each service request that is available for display. When an agent selects service request identifier 146, detail display window 142 is populated with the details of the service request, including a summary 144.

In one embodiment of the present invention, selecting smartshare button 182 while a service request identifier 146 is selected in available service requests list 148 results in the transmission via chat to session window 116 of service request identifier 146 and summary 144. In some embodiments, both the email and the notice of delivery are subject to editing before being sent.

Figure 2:
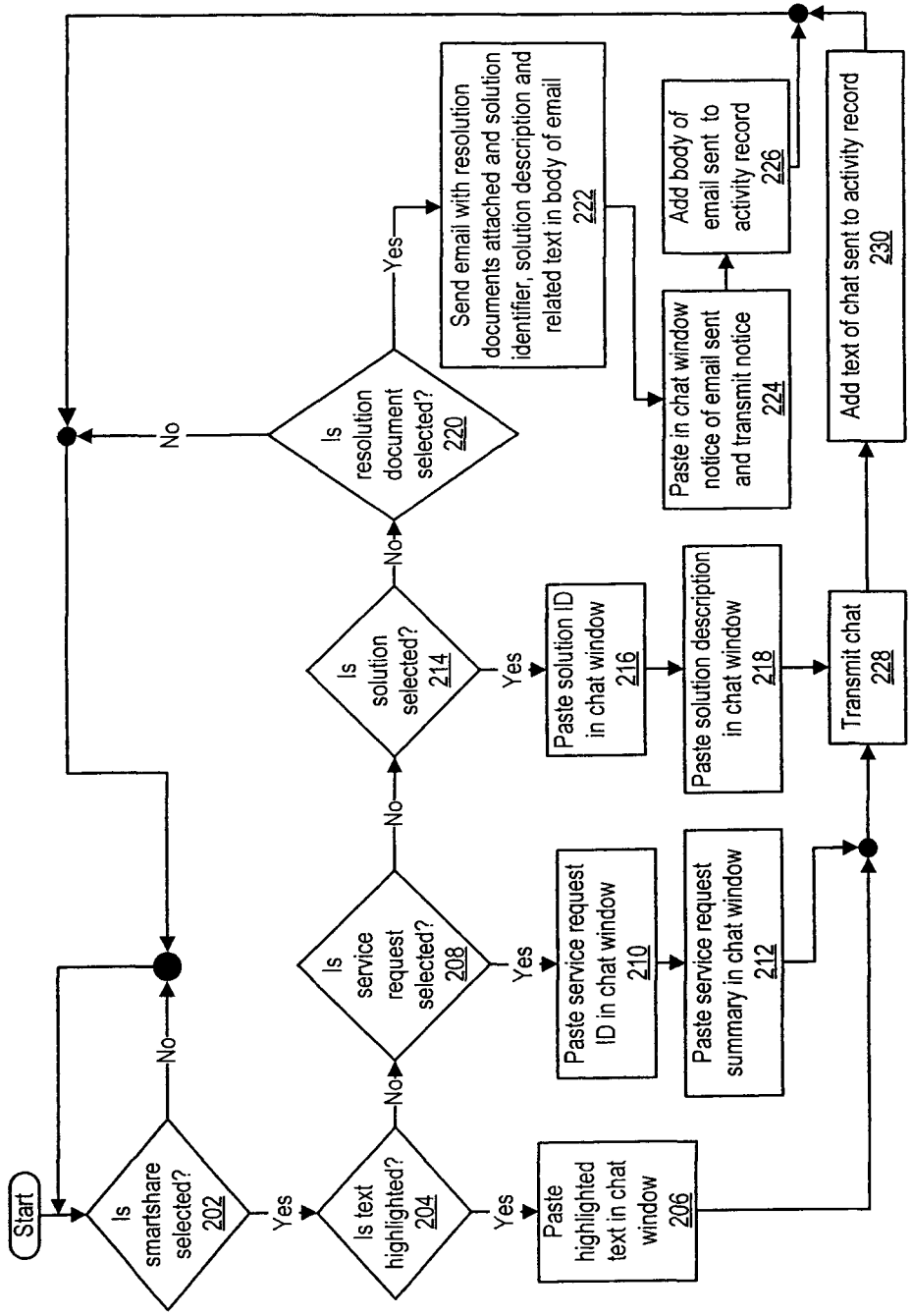
FIG. 2 is a flowchart describing one embodiment of a smart share utility in accordance with the present invention.

FIG. 2 is a flowchart describing one embodiment of a smart share utility in accordance with the present invention. In one embodiment of the present invention, agent interface 102 employs a hierarchy of decisions as to the type of a data item, represented by steps 204, 208, 214 and 220. Each decision as to the type of a data item serves as a starting point to a series of actions to support the type of data item indicated by the decision.

The process begins with step 202, which depicts agent interface 102 determining whether smartshare button 182 has been selected. If agent interface 102 determines that smartshare button 182 has been selected, then the process next moves to step 204. Step 204 illustrates agent interface 102 determining whether highlighted text 179 is selected within agent interface 102. If agent interface 102 determines that highlighted text 179 is selected within agent interface 102, then the process proceeds to step 206, which depicts agent interface 102 copying and pasting highlighted text 179 to chat text entry box 172. The process next moves to step 228. Step 228 illustrates agent interface 102 transmitting the content of chat text entry box 172 to a customer. One skilled in the art will appreciate, in light of the present disclosure, that the user may have had the opportunity to edit the content of chat text entry box 172 between the paste performed in step 206 and the transmission performed in step 228 without departing from the scope of the present invention. In fact, in some embodiments, text is pasted to text entry box 172 and is not transmitted until a transmit button 164 is selected.

The process then proceeds to step 230, which depicts agent interface 102 adding to an activity record stored in application data the content of chat text entry box 172 sent in step 228. The process then returns to step 202, which is described above.

Returning to step 204, if agent interface 102 determines that highlighted text 179 is not selected within agent interface 102, then the process next moves to step 208. Step 208 illustrates agent interface 102 determining whether a service request identifier 146 is selected within agent interface 102. If agent interface 102 determines that a service request identifier 146 is selected within agent interface 102, then the process proceeds to step 210, which depicts agent interface 102 copying and pasting service request identifier 146 to chat text entry box 172. The process next moves to step 212. Step 212 illustrates agent interface 102 copying and pasting service request summary 144 to chat text entry box 172. The process next moves to step 228, which is described above.

Returning to step 208, if agent interface 102 determines that a service request identifier 146 is not selected within agent interface 102, then the process next moves to step 214. Step 214 illustrates agent interface 102 determining whether a solution document identifier 181 is selected within agent interface 102. If agent interface 102 determines that a solution document identifier 181 is selected within agent interface 102, then the process proceeds to step 216, which depicts agent interface 102 copying and pasting solution document identifier 181 to chat text entry box 172. The process next moves to step 218. Step 218 illustrates agent interface 102 copying and pasting solution description 167 to chat text entry box 172. The process next moves to step 228, which is described above.

Returning to step 214, if agent interface 102 determines that solution document identifier 181 is not selected within agent interface 102, then the process next moves to step 220. Step 220 illustrates agent interface 102 determining whether a resolution document identifier 122 is selected within agent interface 102. If agent interface 102 determines that a resolution document identifier 122 is not selected within agent interface 102, then the process returns to step 202, which is described above.

If agent interface 102 determines that a resolution document identifier 122 is selected within agent interface 102, then the process proceeds to step 222, which depicts agent interface 102 sending an email with resolution documents, such as related text 126 as attachments and an associated solution identifier 181 and solution description 167 pasted into the body of the email. A resolution document contains step-by-step information on how to resolve a particular problem, with attachments, which the present invention allows an agent to transmit to a customer. In some embodiments of the present invention, editing of the email is allowed prior to transmission, as described above with respect to editing of text in chat window 172. The process then proceeds to step 224, which illustrates agent interface 102 copying and pasting a notice of the sent email into chat text entry box 172 and transmitting the notice. The process next moves to step 226. Step 226 illustrates agent interface 102 adding to an activity record stored in application data the body of the email sent in step 224. The process then returns to step 202, which is described above.

Figure 3:
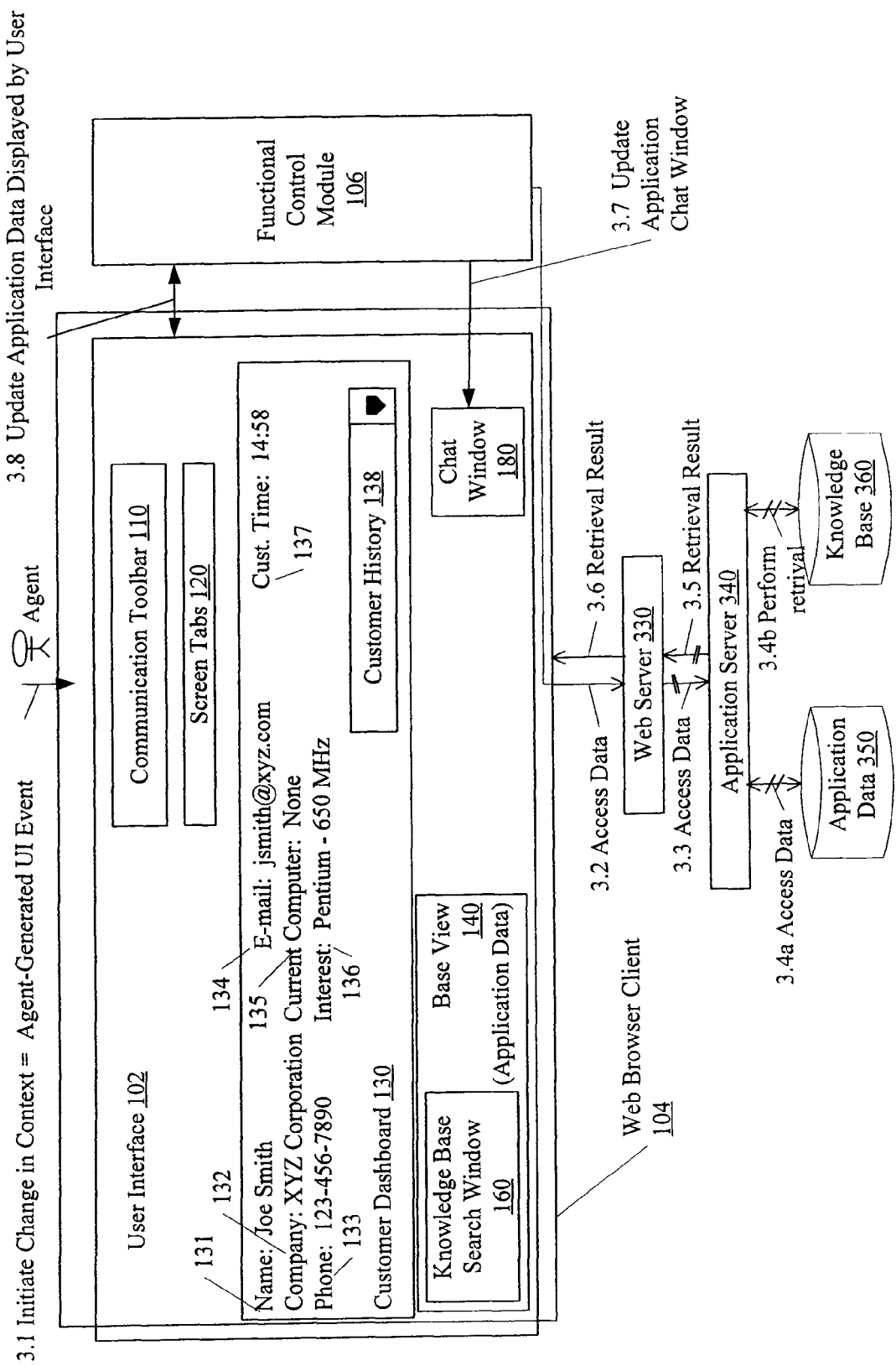
FIG. 3 shows actions taken when operating a smart share utility in response to agent input in accordance with one embodiment of the present invention.

FIG. 3 shows actions taken when operating a smart share utility in response to agent input in accordance with one embodiment of the present invention. When an agent requests a transfer of data using smartshare button 182, a data transfer is initiated, which in turn updates chat window 180. In action 3.1, the agent initiates a data transfer by, for example, selecting resolution document identifier 122 and actuating smartshare button 182. In action 3.2, functional control module 106, which is actually housed on application server 340 but displayed separately for purposes of clarity, passes a request to access data to web server 330, requesting, for example, resolution documents, such as related text 126 and an associated solution identifier 181 and solution description 167 from knowledge base 360 (or, alternatively service request identifier 146 and service request summary 144 from application data 350). In action 3.3, web server 330 passes the access request to application server 340. Application server 340 includes a customer data retrieval business service and a knowledge base retrieval business service (not shown) to assist with obtaining data to push to chat window 180. As noted by the broken arrow connecting web server 330 to application server 340, intermediate software modules may be present between web server 330 and application server 340.

Application server 340 retrieves application data 350, such as customer data from a customer, service request identifier 146 and service request summary 144, in action 3.4*a* or performs a retrieval from knowledge base 360 in action 3.4*b*. As noted by the broken arrows connecting application server 340 to application data 350 and knowledge base 360, several intermediate modules may be present, such as a database server (not shown). Application server 340 provides retrieval results to web server 330 in action 3.5, and web server 330 provides retrieval results to web browser client 104 in action 3.6. In action 3.7, functional control module 106 updates data in chat window 180 by pasting results received in action 3.6 to chat text entry box 172. In action 3.8, functional control module 106 updates any additional application data displayed by agent interface 102.

Figure 4:
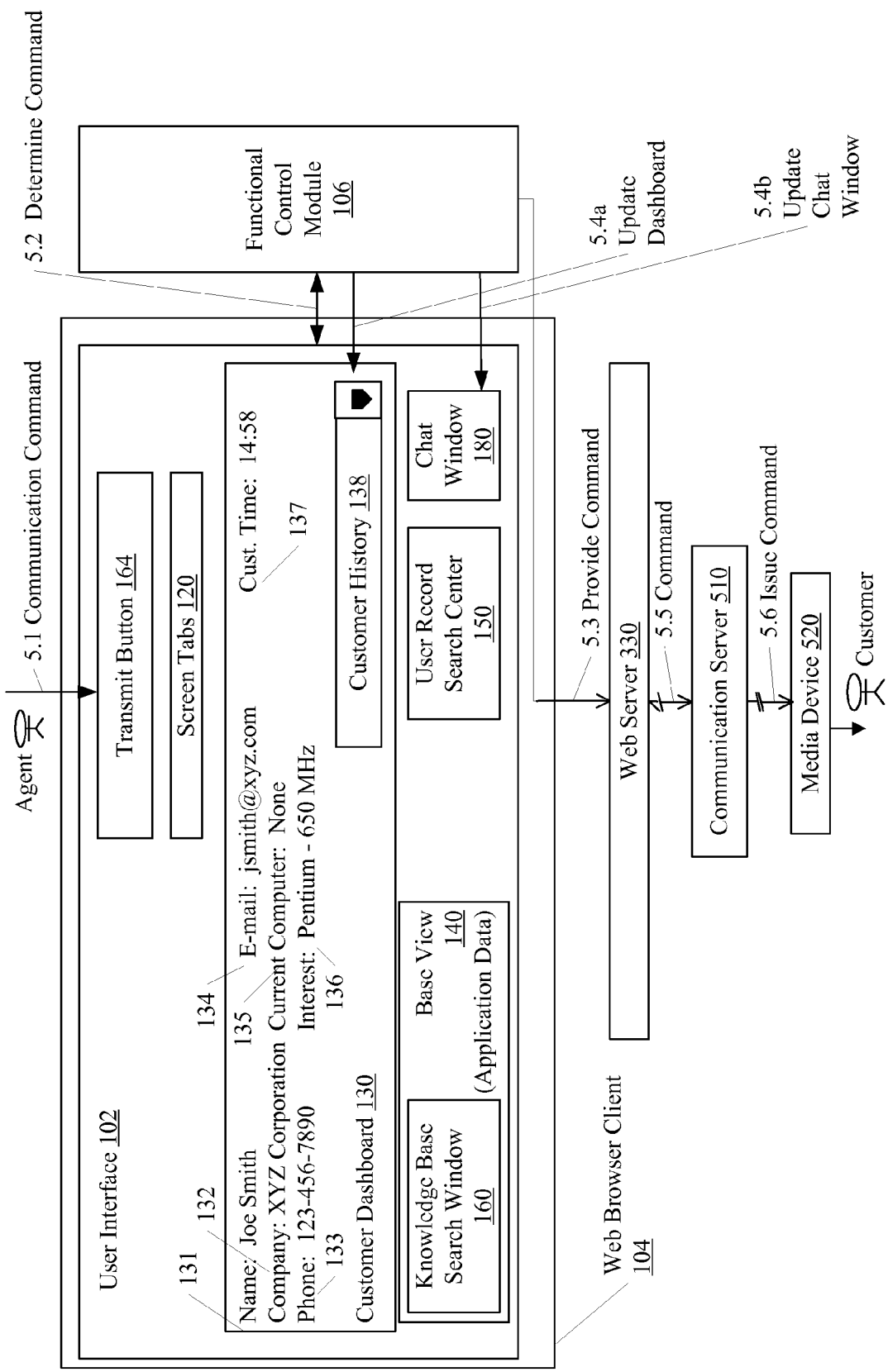
FIG. 4 shows actions taken when operating a smart share utility in conjunction with an outgoing communication command in accordance with one embodiment of the present invention.

FIG. 4 shows actions taken when operating a smart share utility in conjunction with an outgoing communication command in accordance with one embodiment of the present invention. Issuing a communication command is similar to the agent-generated agent interface events described with reference to FIG. 3, although other software modules, such as communication server 510, are involved. In action 5.1, the customer service agent selects transmit button 164 on toolbar 165 to send to a customer the content of chat text entry box 172. The resulting communication command produces a change in context that is used to update persistent dashboard 130, such as by altering a customer history 138 supported by persistent dashboard 130 with a service request, and, in some embodiments, updates base view 140. Updating persistent dashboard 130 and base view 140 may involve additional modules not shown, such as those of application server 340 of FIG. 3, to perform actions, such as the preparation and transmission of an email or access to application data related to the communication command.

In action 5.2, functional control module 106 determines the communication command to be issued. In action 5.3, functional control module 106 provides the command to be issued to web server 330. Web server 330 provides a communication command, such as transmission of chat text, to communication server 410. In action 5.4*a*, functional control module 106 updates persistent dashboard 130 with context information resulting from the execution of the communication command. In action 5.4*b*, functional control module 106 updates chat window 180 by placing in session window 178 any content sent to the customer as a result of selecting transmit button 164. Web server 330 then sends a transmission command to communication server 510 in action 5.5. Communication server 510 then issues a chat transmission command in action 5.6, via several intermediate software modules (not shown), to media device 520.

Figure 5:
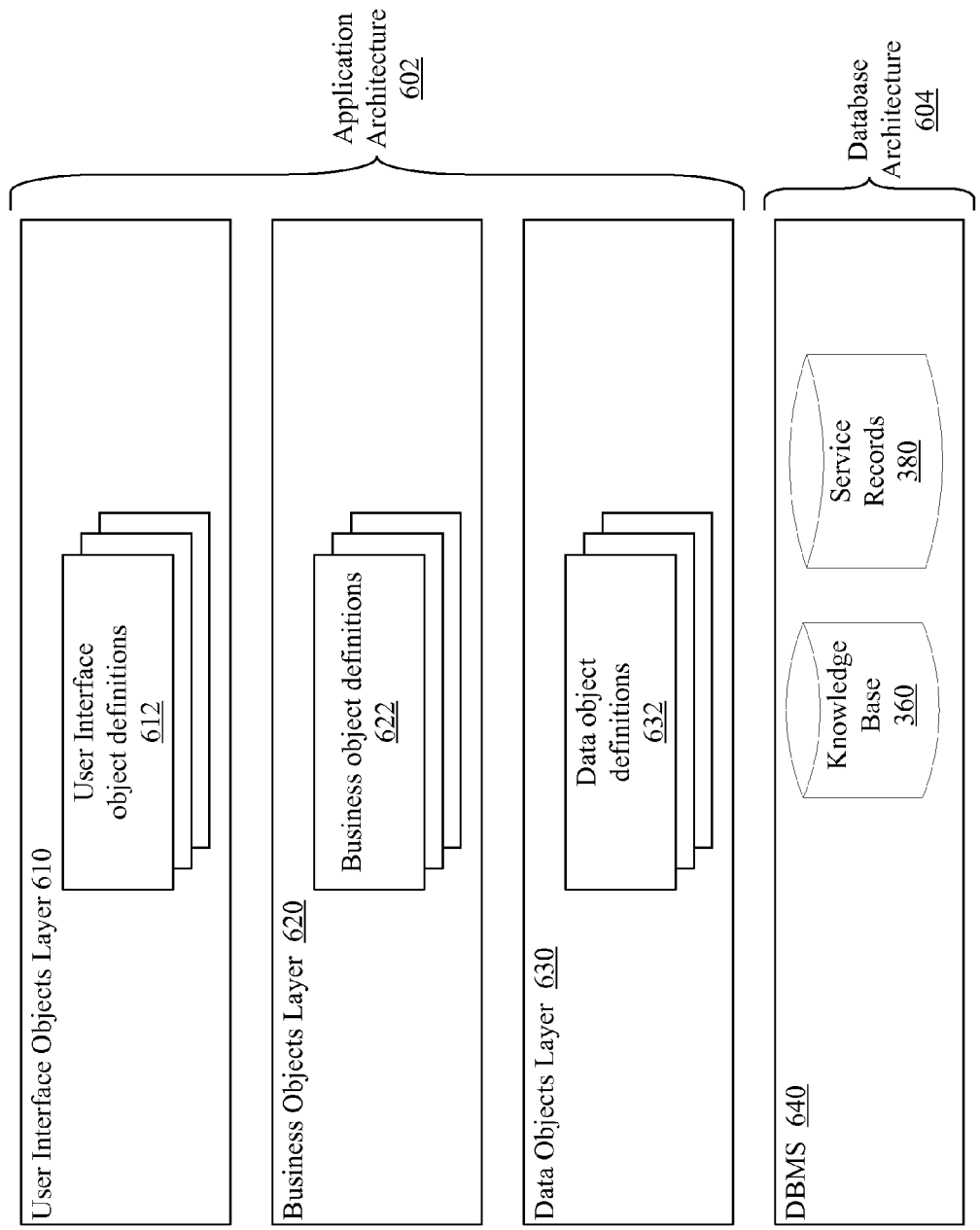
FIG. 5 is a diagram of a layered architecture in which an embodiment of the smart share utility can be implemented.

FIG. 5 is a diagram of a layered architecture in which an embodiment of the smart share utility can be implemented and support the operations depicted in FIG. 3 and FIG. 4. Application architecture 602 includes user interface objects layer 610, business objects layer 620, and data objects layer 630. User interface objects layer 610 includes one or more user interface object definitions 612. An example of a user interface object definition is a view definition for chat window 180. Business objects layer 620 includes one or more business object definitions 622. An example of a business object definition is a contact business object definition, which is used to populate persistent dashboard 130 and customer information pane 162. Data objects layer 630 includes one or more data object definitions 632. An example of a data object definition is a schema for a database table. Underlying database architecture 604, which is used to store application data, includes a database management system (DBMS) 640 containing knowledge base 360.

Figure 6:
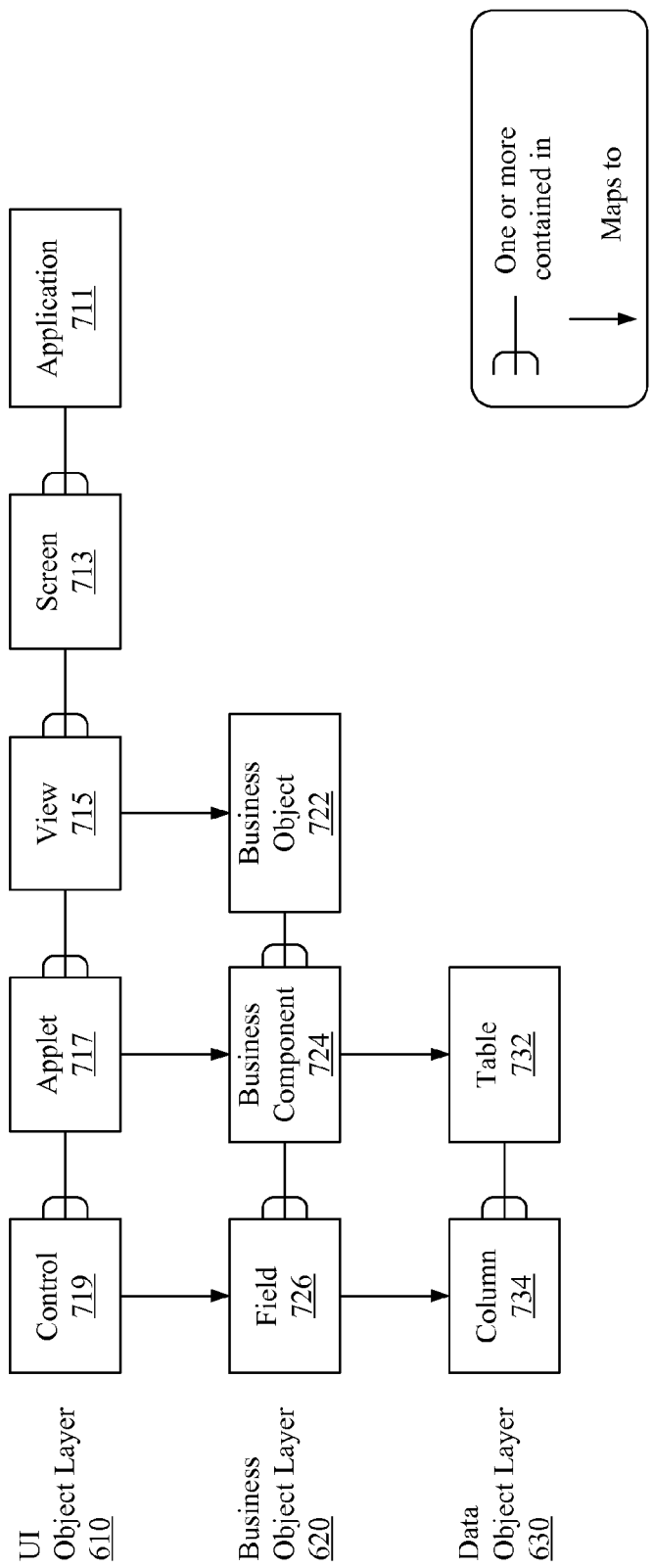
FIG. 6 is a diagram of object layers and object definitions according to the layered architecture of FIG. 5.

FIG. 6 is a diagram of object layers and object definitions according to the layered architecture of FIG. 5. User interface objects layer 610 includes object definitions application 711, screen 713, view 715, applet 717, and control 719. As used herein, an application object definition defines a collection of screens and does not define an application program. Application object definition 711 includes one or more screens 713. Each screen 713 may contain one or more view 715. A view presents one or more applets together at one time in a predefined visual arrangement and logical data relationship. Each view 715 may contain one or more applets 717. In the architecture of the present invention, the term applet is used to describe a form including one or more fields and controls, and is distinguishable from the term applet when used to describe, for example, a Java& program referred to as a Java® applet. Each applet 717 may include one or more control 719.

Business objects layer 620 includes business object definition 722, business component definition 724, and field object definition 726. Each business object definition 722 can include one or more business component object definition 724. Each business component object definition 724 may include one or more field object definition 726.

Data object layer 630 includes table object definition 732 and column object definition 734. Each table object definition 732 can include one or more column object definition 734.

As shown in FIG. 6, view object definition 715 of user interface object layer 610 maps to business object definition 722 of business objects layer 620. A mapping indicates a one-to-one relationship between objects defined according to the object definitions. For example, a contact view of agent interface 102 displays data for a contact business object.

As noted above, a view may include one or more applets, and a business object may include one or more business components. Accordingly, applets object definition 717 of user interface object layer 610 maps to business component object definition 724 of business objects layer 620. A particular applet, or form, of agent interface 102 includes data for a particular business component. Furthermore, a business component, such as business component 724, maps to an object definition, such as table object definition 732, of data objects layer 630. Consequently, a particular applet displays data for a particular business component from a particular data table. In at least one embodiment, a "virtual" business component corresponds to a business component for which data are not obtained from a single database table, but instead are the result of a combination of joins with two or more database tables.

Control object definition 719 of user interface object layer 610 maps to field object definition 726 of business objects layer 620. A particular control within an applet corresponds to a field object definition. Furthermore, field object definition 726 maps to column object definition 734 of data object layer 630. Data for a column of a particular table corresponds to a field of the corresponding business component and is displayed within a control in a corresponding applet.

Smartshare button 182 is based on a virtual business component called "smart share utility" which connects to an instance of a "smartshare" business object. Examples of object definitions related to an information sharing utility, such as smartshare button 182, are given below:
Smartshare Button Business Object
Smartshare Button Business Component (virtual business component)
Smartshare Button Business Service (controls the functionality)
Smartshare Button Applet (user interface)
Smartshare Button View (user interface)

When updating chat window 180 in response to actuation of smartshare button 182, a SmartScript response or an application program can use an SmartShare application program interface (API) for the Smartshare Button Business Service. The SmartShare API can be called using the InvokeMethod function of the Smartshare Button Business Service and passing a set of name/value pairs, such as the following:
Source Name: 'Base View'
BusComp Name: 'SmartShare'
RowId: 'highlightedtext'

In one embodiment, the InvokeMethod function of the Smartshare Button Business Service is used to call SmartShare API for configurable events. For example, an enterprise may define a customized event related to use of Smartshare Button Business Service, for instance, to indicate a reference already transmitted, for which reference list 166 is updated and associate the customized event with a button on an applet within the agent interface.

Upon receiving the arguments, the invoked function of the Smartshare Button Business Service obtains the set of fields configured to be displayed. The invoked function then retrieves corresponding data from application databases and knowledge base 360, and populates chat window 180.

In one embodiment, Smartshare button 182 is configurable. For example, various data type hierarchy changes can be made, such as changing the transmission data type identification and transmission hierarchy reflected in steps 204, 208, 214 and 220.

A chat engine within the host application server is responsible for ensuring that chat window 182 is updated whenever a smartshare occurs. In one embodiment, the chat engine is implemented as a chat engine business service. The chat engine business services provides an application program interface (API) that includes a member function to update chat window 180 agent interface 102. Such an API can be implemented, for example, as UpdateChatWindwoAPI. Member functions can correspond to a command definition for a command to, for example, push retrieval results to chat window 180. The UpdateChatWindow API may further include a command definition for a maintain command to information for display in chat window 180 until a change in context occurs.

Figure 7:
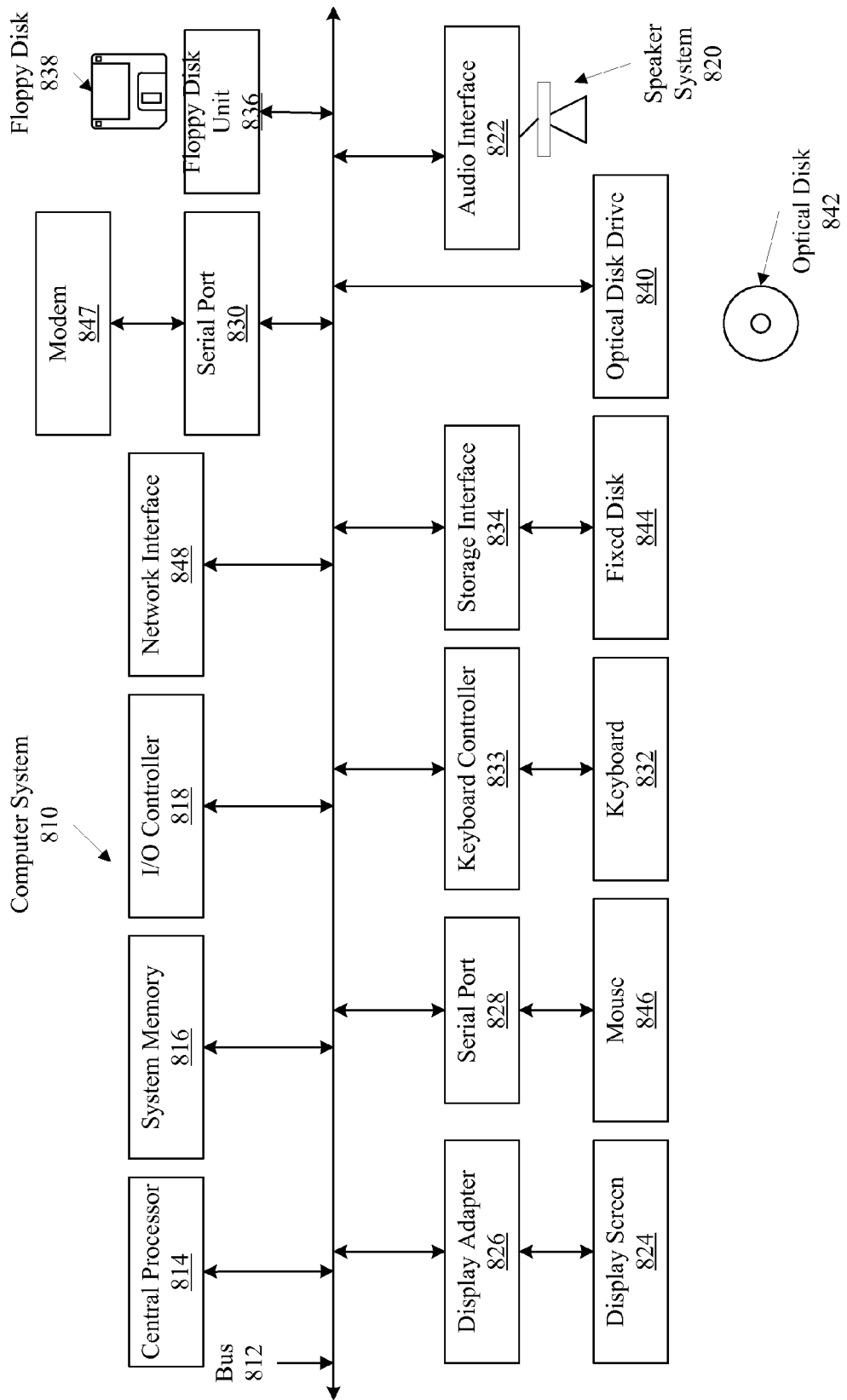
FIG. 7 is a block diagram illustrating a computer system suitable for implementing embodiments of the present invention.

FIG. 7 depicts a block diagram of a computer system 810 suitable for implementing the present invention. Computer system 810 includes a bus 812 which interconnects major subsystems of computer system 810 such as a central processor 814, a system memory 816 (typically RAM, but which may also include ROM, flash RAM, or a similar computer-readable storage medium), an input/output controller 818, an external audio device such as a speaker system 820 via an audio output interface 822, an external device such as a display screen 824 via display adapter 826, serial ports 828 and 830, a keyboard 832 (interfaced with a keyboard controller 833), a storage interface 834 for interfacing with a computer-readable storage medium such as a floppy disk drive 836 operative to receive a floppy disk 838, and a CD-ROM drive 840 operative to receive a CD-ROM 842. Also included are a mouse 846 (or other point-and-click device, coupled to bus 812 via serial port 828), a modem 847 (coupled to bus 812 via serial (or USB) port 830) and a network interface 848 (coupled directly to bus 812).

Bus 812 allows data communication between central processor 814 and system memory 816, which may include both read only memory (ROM) or flash memory (neither shown), and random access memory (RAM) (not shown), as previously noted. The RAM is generally the main memory into which the operating system and application programs are loaded and typically affords at least 816 megabytes of memory space. The ROM or flash memory may contain, among other code, the Basic Input-Output system (BIOS) which controls basic hardware operation such as the interaction with peripheral components. Applications resident with computer system 810 are generally stored on and accessed via a computer readable storage medium, such as a hard disk drive (e.g., fixed disk 844), an optical drive (e.g., CD-ROM or DVD drive 840), floppy disk unit 836 or other storage medium.

Storage interface 834, as with the other storage interfaces of computer system 810, may connect to a standard computer readable storage medium for storage and/or retrieval of information, such as a fixed disk drive 844. Fixed disk drive 844 may be a part of computer system 810 or may be separate and accessed through other interface systems. Many other devices can be connected such as a mouse 846 connected to bus 812 via serial port 828, a modem 847 connected to bus 812 via serial port 830 and a network interface 848 connected directly to bus 812. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Figure 8:
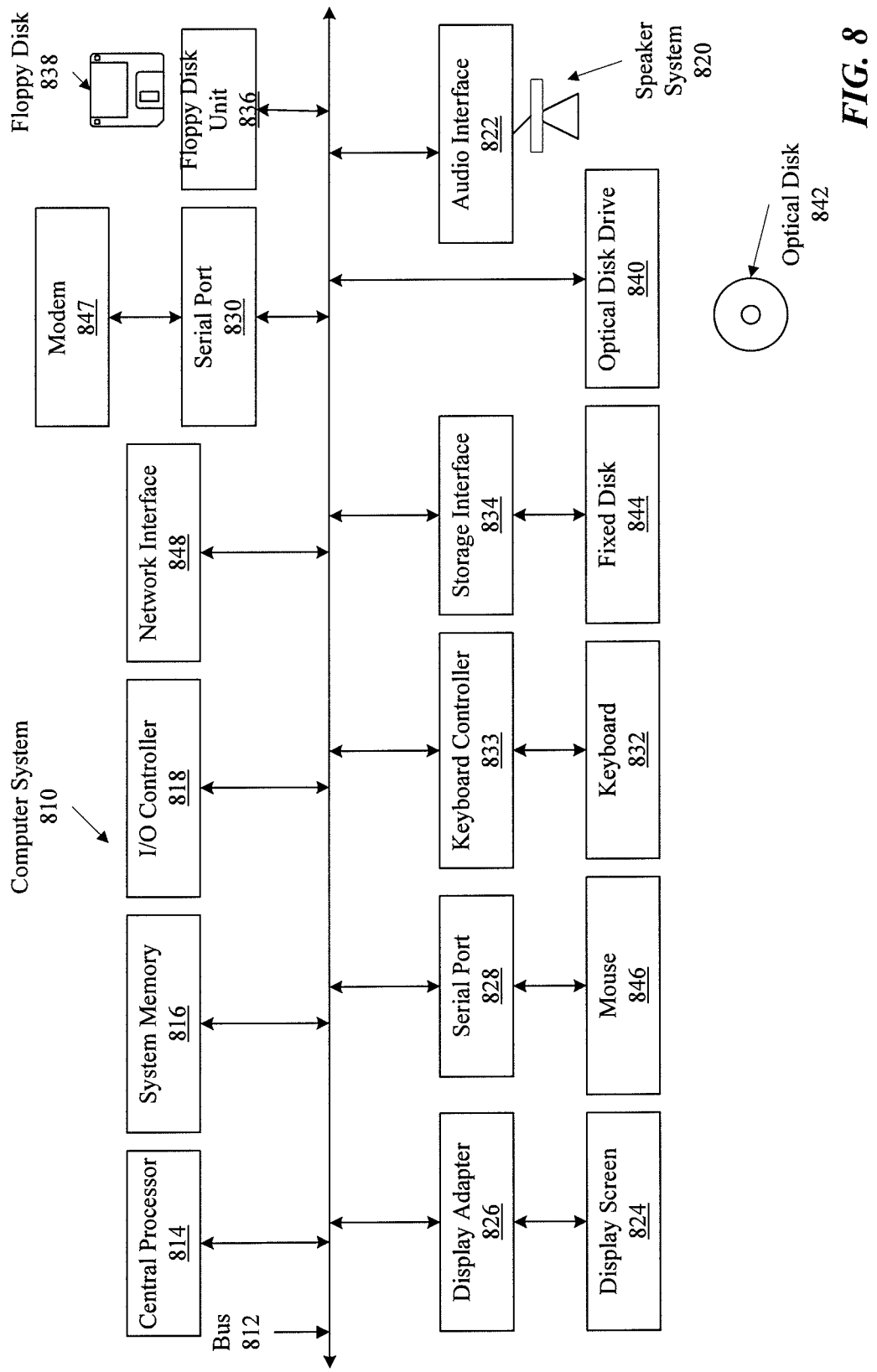

Many other devices or subsystems (not shown) may be connected in a similar manner (e.g., bar code readers, document scanners, digital cameras and so on). Conversely, it is not necessary for all of the devices shown in FIG. 7 to be present to practice the present invention. The devices and subsystems may be interconnected in different ways from that shown in FIG. 8. The operation of a computer system such as that shown in FIG. 7 is readily known in the art and is not discussed in detail in this application. Code to implement the present invention may be stored in computer-readable storage media such as one or more of system memory 816, fixed disk 844, CD-ROM 842, or floppy disk 838. Additionally, computer system 810 may be any kind of computing device, and so includes personal data assistants (PDAs), network appliances, X-window terminals or other such computing devices. The operating system provided on computer system 810 may be MS-WINDOWS®, Mac OS 10®, UNIX®, Linux® or other known operating system. Computer system 810 also supports a number of Internet access tools, including, for example, an HTTP-compliant web browser having a JavaScript interpreter.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of media used to actually carry out the distribution. Examples of signal bearing media include recordable media such as floppy disks and CD-ROM, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
monitoring a user interface for a data item delivery request, using a processor, wherein
said data item delivery request is a request for delivery of at least a portion of a data item,
said data item delivery request is generated by a user interface event associated with said user interface,
said user interface facilitates interaction with context information and application data by concurrently displaying said context information and said application data,
said context information is related to a customer,
said application data facilitates selection of said data item, and
said user interface allows said at least said portion of said data item to be shared with said customer; and
in response to receipt of said data item delivery request,
determining a data type of said data item, using said processor,
selecting a schema from a plurality of schemas, using said processor, wherein
said schema is selected based on said data type,
said at least said portion of said data item comprises content,
said schema is used in performing said delivery by defining communications via one or more communication channels of a plurality of communication channels to be used to deliver at least a portion of said content,
each of said plurality of communication channels is one of a plurality of types of communication channels, and
each of said plurality of schemas defines communications via at least one of said plurality of types of communication channels,
determining at least a portion of said content, using said processor, and
initiating, using said processor, said delivery by sending said at least said portion of said content via said one or more communication channels, using said schema.

2. The method of claim 1, wherein
said user interface allows said at least said portion of said data item to be shared with said customer by virtue of said user interface allowing selection of said data item, and
said at least said portion of said content is determined based on
said data type, and
said schema.

3. The method of claim 2, wherein
said data type indicates said data item is a resolution document,
said schema defines said communications type as being at least one of
electronic mail, or
real-time chat, and
said at least said portion of said content comprises at least one of
a text of said resolution document,
a solution identifier,
a solution description, or
an item of related text.

4. The method of claim 3, wherein said sending comprises:
attaching said resolution document to an item of electronic mail, using said processor,
entering in a body of said item of said electronic mail said solution identifier, using said processor,
entering in said body of said item of said electronic mail said solution description, using said processor,
entering in said body of said item of said electronic mail said item of related text, using said processor,
sending said item of said electronic mail, using said processor, and
sending a notice of delivery of said item of said electronic mail via said real-time chat, using said processor.

5. The method of claim 4, further comprising:
recording said data item delivery request and said delivery in an activity log, wherein
said recording comprises
creating an entry in an activity record, using said processor, and
said entry comprises
said body of said item of said electronic mail, and
a list identifying said resolution document.

6. The method of claim 2, wherein
said data type indicates said data item is a service request,
said schema defines said communications type as being a real-time chat,
said at least said portion of said content comprises at least one of
a summary of said service request, or
an identifier of said service request, and
said sending comprises
pasting said summary of said service request into a chat delivery window, using said processor,
pasting said identifier of said service request into said chat delivery window, using said processor, and
sending said summary of said service request, using said processor.

7. The method of claim 6, further comprising:
recording said data item delivery request and said delivery in an activity log, wherein
said recording comprises
creating an entry in an activity record, and
said entry comprises
said at least said portion of said content.

8. The method of claim 2, wherein
said data type indicates said data item is a highlighted text,
said schema defines said communications type as being a real-time chat,
said at least said portion of said content includes a highlighted text region, and
said sending comprises
pasting said highlighted text into a chat delivery window, using said processor, and
sending said highlighted text, using said processor.

9. The method of claim 2, wherein
said data type indicates said data item is a solution document, said schema defines said communications type as being a real-time chat,
said at least said portion of said content comprises at least one of
an identifier of said solution, or
a description of said solution, and
said sending comprises
pasting said identifier of said solution into a chat delivery window, using said processor,
pasting said description of said solution into said chat delivery window, using said processor,
sending said identifier of said solution via said real-time chat, using said processor, and
sending said description of said solution via said real-time chat, using said processor.

10. The method of claim 2, wherein
said user interface persistently displays said context information,
said context information and said application data are related to one another, and
said context information indicates said data type.

11. The method of claim 2, wherein
said user interface event is associated with selection of a button of said user interface, and
said user interface concurrently displays said button with said customer-related data and said product-related data.

12. The method of claim 2, wherein
said user interface allows said at least said portion of said data item to be automatically shared with said customer.

13. The method of claim 2, wherein
said delivery is made via a communications channel of said communication channels, and
each of said communication channels is of one of a corresponding type of a plurality of types.

14. A non-transitory computer-readable storage medium comprising:
a first set of instructions configured to monitor a user interface for a data item delivery request, wherein
said data item delivery request is a request for delivery of at least a portion of a data item,
said data item delivery request is generated by a user interface event associated with said user interface,
said user interface facilitates interaction with context information and application data by concurrently displaying said context information and said application data,
said context information is related to a customer,
said application data facilitates selection of said data item, and
said user interface allows said at least said portion of said data item to be shared with said customer by virtue of said user interface allowing selection of said data item; and
a second set of instructions configured to, in response to receipt of said data item delivery request,
determine said data item,
select a schema from a plurality of schemas, wherein
said schema is used in performing said delivery,
said schema is selected based on said data type,
said at least said portion of said data item comprises content,
said schema is used in performing said delivery by defining communications via one or more communication channels of a plurality of communication channels to be used to deliver at least a portion of said content,
each of said plurality of communication channels is one of a plurality of types of communication channels, and
each of said plurality of schemas defines communications via at least one of said plurality of types of communication channels,
determine at least a portion of said content, wherein
said at least said portion of said content is determined based on said data type, and
said schema, and
initiate said delivery by sending said at least said portion of said content via said one or more communication channels, using said schema.

15. The non-transitory computer-readable storage medium of claim 14, wherein said data type indicates said data item is a resolution document,
said schema defines said communications type as being at least one of
electronic mail, or
real-time chat, and
said at least said portion of said content comprises at least one of
a text of said resolution document,
a solution identifier,
a solution description, or
an item of related text.

16. The non-transitory computer-readable storage medium of claim 15, wherein said sending comprises:
attaching said resolution document to an item of electronic mail,
entering in a body of said item of said electronic mail said solution identifier,
entering in said body of said item of said electronic mail said solution description,
entering in said body of said item of said electronic mail said item of related text,
sending said item of said electronic mail, and
sending a notice of delivery of said item of said electronic mail via said real-time chat.

17. The non-transitory computer-readable storage medium of claim 14, wherein
said data type indicates said data item is a service request,
said schema defines said communications type as being a real-time chat,
said at least said portion of said content comprises
a summary of said service request, and
said sending comprises
pasting said summary of said service request into a chat delivery window, and
sending said summary of said service request.

18. The non-transitory computer-readable storage medium of claim 14, wherein
said data type indicates said data item is a solution document,
said schema defines said communications type as being a real-time chat,
said at least said portion of said content comprises at least one of
an identifier of said solution, or
a description of said solution, and
said sending comprises
pasting said identifier of said solution into a chat delivery window,
pasting said description of said solution into said chat delivery window,
sending said identifier of said solution via said real-time chat, and sending said description of said solution via said real-time chat.

19. An apparatus comprising:
a processor;
a non-transitory computer-readable storage medium coupled to said processor; and
a plurality of instructions, encoded in said non-transitory computer-readable storage medium, and which, when executed by said processor, cause said processor to
  monitor a user interface for a data item delivery request, wherein
    said data item delivery request is a request for delivery of at least a portion of a data item,
    said data item delivery request is generated by a user interface event associated with said user interface,
    said user interface facilitates interaction with context information and application data by concurrently displaying said context information and said application data,
    said context information is related to a customer,
    said application data facilitates selection of said data item, and
    said user interface allows said at least said portion of said data item to be shared with said customer by virtue of said user interface allowing selection of said data item, and
  in response to receipt of said data item delivery request,
    determine a data type of said data item,
    select a schema from a plurality of schemas, wherein
      said schema is used in performing said delivery,
      said schema is selected based on said data type,
      said at least said portion of said data item comprises content,
      said schema is used in performing said delivery by defining communications via one or more communication channels of a plurality of communication channels to be used to deliver at least a portion of said content,
      each of said plurality of communication channels is one of a plurality of types of communication channels, and
      each of said plurality of schemas defines communications via at least one of said plurality of types of communication channels,
    determine at least a portion of said content, wherein
      said at least said portion of said content is determined based on
        said data type, and
        said schema, and
    initiate said delivery by sending said at least said portion of said content via said one or more communication channels, using said schema.

20. The apparatus of claim 19, wherein
said data type indicates said data item is a resolution document,
said schema defines said communications type as being at least one of electronic mail, or real-time chat, and
said at least said portion of said content comprises at least one of a text of said resolution document,
  a solution identifier,
  a solution description, or
  an item of related text.

21. The apparatus of claim 20, wherein said plurality of instructions further comprises instructions that, when executed by said processor, cause said processor to:
  attach said resolution document to an item of electronic mail,
  enter in a body of said item of said electronic mail said solution identifier,
  enter in said body of said item of said electronic mail said solution description,
  enter in said body of said item of said electronic mail said item of related text,
  send said item of said electronic mail, and
  send a notice of delivery of said item of said electronic mail via said real-time chat.

22. The apparatus of claim 21, wherein said plurality of instructions further comprises instructions that, when executed by said processor, cause said processor to:
  record said data item delivery request and said delivery in an activity log, wherein
    said instructions that, when executed by said processor, cause said processor to record comprise instructions that, when executed by said processor, cause said processor to
      create an entry in an activity record, and
    said entry comprises
      said body of said item of said electronic mail, and
      a list identifying said resolution document.

23. The apparatus of claim 19, wherein
said data type indicates said data item is a service request,
said schema defines said communications type as being a real-time chat,
said at least said portion of said content comprises a summary of said service request, and
said instructions that, when executed by said processor, cause said processor to send said at least said portion of said content using said schema comprise instructions that, when executed by said processor, cause said processor to
  paste said summary of said service request into a chat delivery window, and
  send said summary of said service request.

24. The apparatus of claim 19, wherein
said data type indicates said data item is a solution document,
said schema defines said communications type as being a real-time chat,
said at least said portion of said content comprises at least one of
  an identifier of said solution, or
  a description of said solution, and
said instructions that, when executed by said processor, cause said processor to send said at least said portion of said content using said schema comprise instructions that, when executed by said processor, cause said processor to
  paste said identifier of said solution into a chat delivery window,
  paste said description of said solution into said chat delivery window,
  send said identifier of said solution via said real-time chat, and
  send said description of said solution via said real-time chat.

* * * * *

UNITED STATES PATENT AND TRADEMARK OFFICE
CERTIFICATE OF CORRECTION

PATENT NO. : 8,930,465 B2  
APPLICATION NO. : 12/117969  
DATED : January 6, 2015  
INVENTOR(S) : Akbar Jaffer and Richard Dean Day Page 1 of 2

It is certified that error appears in the above-identified patent and that said Letters Patent is hereby corrected as shown below:

In the Claims

In column 13, line 51, in Claim 1, insert --said-- after "determining" and before "at least" and delete "a" and insert --said-- after "at least" and before "portion".

In column 14, line 1, in Claim 3, delete "said" and insert --a-- after "defines" and before "communications".

In column 14, line 35, in Claim 6, delete "said" and insert --a-- after "defines" and before "communications".

In column 14, line 57, in Claim 8, delete "said" and insert --a-- after "defines" and before "communications".

In column 15, line 1, in Claim 9, delete "said" and insert --a-- after "defines" and before "communications".

In column 15, line 26, in Claim 11, delete "said" after "with" and before "customer-related" and delete "said" after "and" and before "product-related".

In column 15, line 57, in Claim 14, insert --a data type of-- after "determine" and before "said".

In column 16, line 7, in Claim 14, insert --said-- after "determine" and before "at least" and delete "a" and insert --said-- after "at least" and before "portion".

In column 16, line 17, in Claim 15, delete "said" and insert --a-- after "defines" and before "communications".

Signed and Sealed this  
Ninth Day of June, 2015

Michelle K. Lee  
*Director of the United States Patent and Trademark Office*

CERTIFICATE OF CORRECTION (continued)
U.S. Pat. No. 8,930,465 B2

In column 16, line 43, in Claim 17, delete "said" and insert --a-- after "defines" and before "communications".

In column 16, line 55, in Claim 18, delete "said" and insert --a-- after "defines" and before "communications".

In column 17, line 45, in Claim 19, insert --said-- after "determine" and before "at least" and delete "a" and insert --said-- after "at least" and before "portion".

In column 17, line 57, in Claim 20, delete "said" and insert --a-- after "defines" and before "communications".

In column 18, line 30, in Claim 23, delete "said" and insert --a-- after "defines" and before "communications".

In column 18, line 45, in Claim 24, delete "said" and insert --a-- after "defines" and before "communications".

UNITED STATES PATENT AND TRADEMARK OFFICE
CERTIFICATE OF CORRECTION

PATENT NO.         : 8,930,465 B2                                              Page 1 of 2
APPLICATION NO.    : 12/117969
DATED              : January 6, 2015
INVENTOR(S)        : Jaffer et al.

It is certified that error appears in the above-identified patent and that said Letters Patent is hereby corrected as shown below:

In the Drawings:

On sheet 6 of 10, in figure 4, under Reference Numeral 160, line 1, delete "Knowlcdgc" and insert -- Knowledge --, therefor.

On sheet 6 of 10, in figure 4, under Reference Numeral 160, line 1, delete "Basc" and insert -- Base --, therefor.

On sheet 6 of 10, in figure 4, under Reference Numeral 140, line 1, delete "Basc" and insert -- Base --, therefor.

On sheet 6 of 10, in figure 4, under Reference Numeral 140, line 1, delete "Vicw" and insert -- View --, therefor.

On sheet 6 of 10, in figure 4, under Reference Numeral 150, line 1, delete "Uscr" and insert -- User --, therefor.

On sheet 6 of 10, in figure 4, under Reference Numeral 150, line 1, delete "Rccord" and insert -- Record --, therefor.

On sheet 6 of 10, in figure 4, below Reference Numeral 106, after 5.4a, line 1, delete "Updatc" and insert -- Update --, therefor.

Signed and Sealed this
Eighth Day of September, 2015

Michelle K. Lee
*Director of the United States Patent and Trademark Office*

On sheet 6 of 10, in figure 4, below Reference Numeral 510, after 5.6, line 1, delete "Issuc" and insert -- Issue --, therefor.

On sheet 9 of 10, in figure 7, under Reference Numeral 846, line 1, delete "Mousc" and insert -- Mouse --, therefor.

On sheet 9 of 10, in figure 7, under Reference Numeral 832, line 1, delete "Kcyboard" and Insert -- Keyboard --, therefor.

On sheet 9 of 10, in figure 7, under Reference Numeral 844, line 1, delete "Fixcd" and insert -- Fixed --, therefor.

On sheet 9 of 10, in figure 7, under Reference Numeral 840, line 1, delete "Drivc" and insert -- Drive --, therefor.

In the Specification:

In column 3, line 33, delete "usemame" and insert -- username --, therefor.

In column 3, line 35, delete "usemame" and insert -- username --, therefor.

In column 5, line 12, delete "usemame" and insert -- username --, therefor.

In column 7, line 64, delete "summary144," and insert -- summary 144, --, therefor.

In column 9, line 10, delete "Java&" and insert -- Java® --, therefor.

In column 10, line 31, delete "UpdateChatWindwoAPI." and insert -- UpdateChatWindow API. --, therefor.